US011412840B2

(12) United States Patent
Jacobowitz

(10) Patent No.: US 11,412,840 B2
(45) Date of Patent: Aug. 16, 2022

(54) DOG TOOTHBRUSH HAVING HALO-ILLUMINATION LIGHTING

(71) Applicant: Just Fur Love, LLC, Boston, MA (US)

(72) Inventor: Naftoli Jacobowitz, New York, NY (US)

(73) Assignee: Just Fur Love, LLC, Boston, MA (US)

(*) Notice: Subject to any disclaimer, the term of this patent is extended or adjusted under 35 U.S.C. 154(b) by 114 days.

(21) Appl. No.: 16/390,289

(22) Filed: Apr. 22, 2019

(65) Prior Publication Data

US 2019/0320788 A1 Oct. 24, 2019

Related U.S. Application Data

(60) Provisional application No. 62/660,954, filed on Apr. 21, 2018.

(51) Int. Cl.
*A01K 13/00* (2006.01)
*A46B 15/00* (2006.01)
*A46B 13/02* (2006.01)
*A61D 5/00* (2006.01)

(52) U.S. Cl.
CPC ........ *A46B 15/0036* (2013.01); *A01K 13/001* (2013.01); *A46B 13/02* (2013.01); *A61D 5/00* (2013.01); *A46B 2200/1086* (2013.01)

(58) Field of Classification Search
CPC ...... A46B 15/0036; A46B 13/02; A01K 13/00
See application file for complete search history.

(56) References Cited

U.S. PATENT DOCUMENTS

2005/0144744 A1* 7/2005 Thiess ................. A61C 17/32
15/22.1

* cited by examiner

*Primary Examiner* — Michael D Jennings
(74) *Attorney, Agent, or Firm* — Wolf, Greenfield & Sacks, P.C.

(57) ABSTRACT

Disclosed is a toothbrush for cleaning teeth of a pet animal. The toothbrush of the present invention is an appropriate device for cleaning a dog's teeth by providing adequate lighting via the same toothbrush during the cleaning process. The lighting provides a halo-illumination lighting effect such that a 360-degree light encircles the tooth during cleaning. The use of halo-illumination allows a user to see top, bottom, and both sides of the dog's mouth in a particular region, thus providing the user sufficient information as to whether they are effectively performing teeth cleaning of the dog.

12 Claims, 8 Drawing Sheets

DOG TOOTHBRUSH HAVING HALO-ILLUMINATION LIGHTING

CROSS-REFERENCE TO RELATED PATENT DOCUMENTS

This patent application claims the benefit of priority of U.S. Provisional Application No. 62/660,954, entitled "DOG TOOTHBRUSH HAVING HALO-ILLUMINATION LIGHTING," filed Apr. 21, 2018, which are hereby incorporated herein by reference in its entirety.

FIELD OF THE INVENTION

The present invention relates generally to handheld devices, and, more particularly, to a toothbrush device for pet animals. The toothbrush device includes halo-illumination lighting that is used while brushing teeth of the pet animals such as dogs.

BACKGROUND

Dental disease is one of the most commonly diagnosed health problems encountered by mammals today. However, dental disease has also been shown in mammals to be one of the most preventable diseases. Humans have developed numerous tools and formulations to regularly clean their teeth, most commonly in residential environments, thus without requiring the use of expensive dental equipment. The most common tool, along with chemical formulations, that humans use to clean their teeth is a toothbrush.

Modern day toothbrushes are designed to clean the various types of teeth in a human, including incisors, canines, premolars, and molars, as well as to clean the gum line. In order to clean other types of mammalian teeth, such as the teeth of dogs, veterinarians and owners have merely taken toothbrushes intended for humans and applied them to dogs. However, a toothbrush designed for humans is not particularly suitable for dogs, in part because of the presence of many more canines in dogs than in humans. Also, because of the grabbing and ripping action of dogs when they bite, dogs usually have more missing teeth than the average human. Further, due to lack of opposing thumbs, dogs are unable to grasp a toothbrush to clean their own teeth. Thus, dog owners and veterinarians are required to clean the dog's teeth. The dog owners and veterinarians encounter various problems while cleaning the dog's teeth. An example of one such problem in using dog-styled toothbrushes, dog owners and veterinarians are unable to obtain a sufficient view of the dog's teeth unless they utilize several lighting devices, such as flashlights, held at different angles, or are positioned in a well-lit room. Most dogs are very fidgety during teeth cleaning, and as a result a dog owner is not likely to sufficiently clean a dog's teeth with a conventional toothbrush having no illuminating light source. Diseases are more likely to spread under such circumstances, even if dog owners are well meaning in attempting to clean the dog's teeth.

In light of the foregoing, there exists a need for a technically improved device and reliable solution that solves the above-mentioned problems and provides an improved teeth illuminating toothbrush device for pet animals that is more effective and more harm resistant for pet animal teeth cleaning.

BRIEF SUMMARY

It is an objective of the present invention to provide a toothbrush for pet animals. The toothbrush of the present invention is highly efficient and appropriate for cleaning a dog's teeth by providing an adequate light source for illuminating the teeth of a pet animal during cleaning. In particular the toothbrush of the present invention provides a halo-illumination lighting effect such that a 360-degree light encircles the pet animal's tooth during cleaning. The use of halo-illumination allows a user to see top, bottom, and both sides of the dog's mouth in a particular region, thus providing the user sufficient information to ensure that they are performing a more effective and more suitable teeth cleaning.

In a preferred embodiment, the toothbrush disclosed in the present invention includes at least one power switch (such as a three-position switch) that may be operated by the user to control the movement or the rotational speed of bristles of the toothbrush. The three-position switch may be operated by the user to switch between three positions. In a first position of the three-position switch, the toothbrush is in an OFF state (i.e., the bristles do not move or rotate). In a second position of the three-position switch, the toothbrush is in an ON state (i.e., the bristles move or rotate), and thus, the toothbrush may be used for brushing or cleaning the teeth of the pet animal. In this position (i.e., the second position), the bristles move or rotate at a medium speed. In a third position of the three-position switch, the toothbrush is in an ON state (i.e., the bristles move or rotate), and thus, the toothbrush may be used for brushing or cleaning the teeth of the pet animal. In this position (i.e., the third position), the bristles rotate at a high speed. In an embodiment, the bristles are a removable set that may be removed and replaced with different shapes and sizes of bristles set.

In addition, the toothbrush further includes a light source portion having a light source for providing a lighting effect such that a 360-degree light encircles the tooth of the pet animals during cleaning the tooth of the pet animal such as a dog's tooth. The toothbrush embodiment having the light source for illuminating a tooth cleaning surface is very advantageous so that the tooth cleaning surface to be cleaned are more clearly visible and distinguishable from the sensitive portions of the pet animal. One preferred toothbrush embodiment further includes a light source switch. The light source switch may be operated by the user to turn ON or turn OFF one or more lights, such as one or more light emitting diodes ("LED's") located in the light source portion of the toothbrush for illuminating the tooth cleaning surface of the pet animal's tooth. One such embodiment of the light source switch utilizes four modes of operation. In a first mode, when the light source switch is pressed by the user, a front half of the light source portion emits light such as by means of one or more LED's with halogen light. In a second mode, when the light source switch is pressed by the user, a rear half of the light source portion emits light such as by means of one or more LED's with halogen light. In a third mode, when the light source switch is pressed by the user, the entire light source portion emits light such as by means of one or more LED's with halogen light. In a fourth mode, when the light source switch is pressed by the user, the light source portion is turned OFF and does not emit any light.

These and other features and advantages of the present invention will become apparent from the detailed description below, in light of the accompanying drawings.

BRIEF DESCRIPTION OF THE ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

Figure 1:
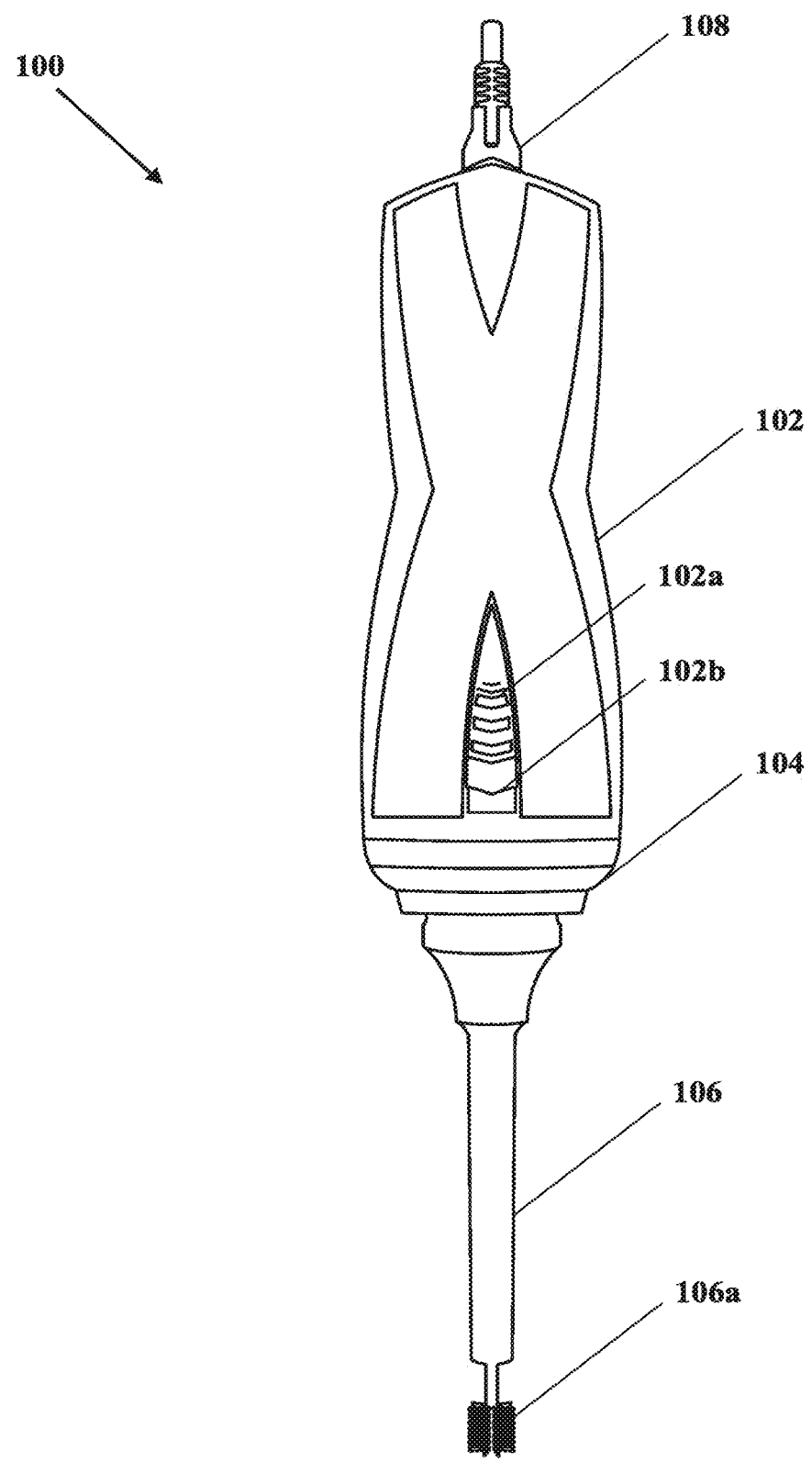
FIG. 1 illustrates a front view of a toothbrush, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes a toothbrush for pet animals. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Techniques consistent with the present invention provide, among other features, a toothbrush for cleaning teeth of pet animals. The toothbrush includes halo-illumination lighting that is used during the cleaning of the teeth of the pet animals such as a dog. As used herein, the term "illumination" refers to the use of a light source to spotlight a particular area or object. The term "halo-illumination" refers to a light source capable of providing 360-degree lighting of an area or object at the same time, whereas the light is emitted along the periphery of a particular light source.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed systems and methods have been described above, it should be understood that they have been presented for purposes of example only, and not limitations. It is not exhaustive and does not limit the invention to the precise form disclosed. Modifications and variations are possible in light of the above teachings or may be acquired from practicing of the invention, without departing from the breadth or scope.

The toothbrush having halo-illumination lighting will now be described with reference to the accompanying drawings, which should be regarded as merely illustrative without restricting the scope and ambit of the present invention.

FIG. 1 illustrates a front view of a toothbrush 100, in accordance with an embodiment of the present invention. The toothbrush 100 includes a plurality of portions such as a body portion 102, a light source portion 104, and an elongated middle portion 106. In an embodiment, the body portion 102, the light source portion 104, and the elongated middle portion 106 are removably assembled or attached together to form the toothbrush 100.

In an embodiment, the body portion 102 (such as an upper body portion of the toothbrush 100) may be made of various materials, including but not limited to, plastic, aluminum, copper, steel or iron. The body portion 102 may include a power switch assembly 102a on its top i.e., on a front part of the body portion 102 as shown in FIG. 1. The power switch assembly 102a may include at least one power switch. The power switch may be an electrical switch, an electronic switch, a mechanical switch, or a combination thereof. In an exemplary embodiment, the power switch may be operated to activate or deactivate (i.e., to turn ON or turn OFF) the toothbrush 100. The power switch may also be operated to control the rotational speed or the movement of a brush head including bristles 106a of the toothbrush 100. The power switch may be operated along three positions such as a first position, a second position, and a third position. In the first position of the power switch, the toothbrush 100 remains in OFF condition (i.e., in deactivated mode), and the brush head including bristles 106a does not rotate or move. In the second position of the power switch, the toothbrush 100 is turned ON (i.e., in activated mode), and the brush head including bristles 106a rotates or moves, and operates at a medium speed. In the third position of the power switch, the toothbrush 100 remains turned ON, and the brush head including bristles 106a rotates or moves, and operates at a high speed. Thus, the power switch of the power switch assembly 102a may be operated by a user to switch between at least the first position, the second position, and the third position to operate the toothbrush 100. In another exemplary embodiment, the power switch assembly 102a may include three power switches such as a first power switch, a second power switch, and a third power switch. The first power switch may be operated to turn OFF the toothbrush 100. The second power switch may be operated to turn ON the toothbrush 100 in which the brush head including bristles 106a operates and rotates at a medium speed. The third power switch may be operated to turn ON the toothbrush 100 and in which the brush head including bristles 106a operates and rotates at a high speed.

In an embodiment, the body portion 102 may further include a light source switch 102b on its top i.e., on a front part of the body portion 102 as shown in FIG. 1. The light source switch 102b may be an electrical switch, an electronic switch, a mechanical switch, or a combination thereof. The light source switch 102b may be operated by the user to turn ON or turn OFF a lighting source, such as one or more light emitting diodes ("LED's" or a series of LED's) included in the light source portion 104 of the toothbrush 100. The light source switch 102b may be associated with at least four modes of operation. Each mode of operation may be activated by pressing or operating the light source switch 102b. In one example, with a first press of the light source switch 102b by the user, a front half of the light source portion 104 is illuminated (i.e., turns ON) and emits halogen light by means of one or more LED's (i.e., the front half of a panel of LED's lights up). Further, with a second press of the light source switch 102b by the user, a rear half of the light source portion 104 is illuminated (i.e., turns ON) and emits halogen light by means of one or more LED's (i.e., the back half of a panel of LED's lights up). Further, with a third press of the light source switch 102b by the user, the entire light source portion 104 is illuminated (i.e., turns ON) and emits halogen light by means of one or more LED's (i.e., the entire panel of LED's lights up). Further, with a fourth press of the light source switch 102b by the user, the light source portion 104 is no longer illuminated (i.e. turns OFF) and does not emit halogen light from any of the one or more LED's. In other embodiments, the light source portion 104 may be comprised of other light emitting means, such as incandescent or fluorescent type light sources.

In an embodiment, the elongated middle portion 106 (such as a lower body of the toothbrush 100) is designed to allow the toothbrush 100 to gain access to all areas of the pet's mouth, including the back molars. The middle portion 106 may be from about 3" to about 5" in length. In one embodiment, the middle portion 106 is telescopic, allowing it to extend from one length to another as required during the cleaning process of the dog's teeth. The middle portion 106 may be made up of a plastic material. The middle portion 106 also includes the brush head including bristles 106a. The brush head including bristles 106a may be designed to fit within the large gaps of the teeth of the pet animals such as the dog, which occurs, for example, when the dog loses teeth, or ages and teeth tend to spread apart at that time. In one embodiment, the brush head including bristles 106a is a circular disc with a broader middle portion. In such an embodiment, the disc has the ability to sufficiently clean the spaces of the pet animals. The brush head including bristles 106a may be made of a polymer material such as rubber or plastic. In one embodiment, the brush head including bristles 106a is made of a foam-like material, allowing toothpaste to be spread onto the bristles 106a for application to the pet's teeth at the initiation of cleaning. The bristles 106a may have different grades of grit ranging from course to soft to buff. The brush head including bristles 106a may be a concave-shaped bristles, a convex-shaped bristle, or a combination thereof, and may be removably fixed or attached to an inner connector (such as a clip or a holding means such as a socket). The brush head including bristles 106a may be removable as well as replaceable. In an embodiment, the rotational speed of the brush head including bristles 106a may be controlled by means of one or more motors that are housed or positioned inside a toothbrush body portion (such as the body portion 102) of the toothbrush 100. The one or more motors may be removably positioned inside the toothbrush 100 to drive the brush head including bristles 106a. For example, when the power switch of the power switch assembly 102a is turned ON (i.e., the power switch is at the second position or the third position), the one or more motors are also turned ON, which in turn rotates the middle portion 106 including the brush head including bristles 106a. In an embodiment, the one or more motors may be configured to operate at two speeds i.e., at the medium speed and at the high speed. The speed of the one or more motors may be controlled by operating the power switch of the power switch assembly 102a. For example, when the power switch is at the second position or at the third position, the one or more motors are turned ON and accordingly operates at the defined medium speed or the defined high speed, which in turn rotates the middle portion 106 including the brush head including bristles 106a at the medium speed or at the high speed.

In FIG. 1, there is further shown an electrical charging or operating cable such as a power chord 108 that may be removably fixed to an input power supply terminal of the toothbrush 100. The input power supply terminal may be located at the top of the toothbrush 100. In one example, the power chord 108 may be utilized by a user to charge at least one battery (not shown) housed or positioned with the toothbrush body portion (such as the body portion 102) of the toothbrush 100. When connected, the power chord 108 may draw an electrical power from a mains power supply and supply the drawn electrical power to the battery of the toothbrush 100 for charging the battery. Upon partial charging or complete charging of the battery of the toothbrush 100, the user may utilize the toothbrush 100 for cleaning the teeth of a pet animal. In another example, the power chord 108 may be utilized by the user to directly supply the electrical power from the mains power supply to toothbrush 100, and the user may utilize the toothbrush 100 for cleaning the teeth of the pet animal. In another example, the power chord 108 may be utilized by the user for charging the battery of the toothbrush 100 and cleaning the teeth of the pet animal at the same time.

The body portion 102 may be designed such that the user can easily grasp and control the toothbrush 100. In one example, the body portion 102 is from 1" to 3" in diameter and 3" to 5" in length. The body portion 102 is tapered at its top to allow strong connection to the middle portion 106. In one embodiment, the body portion 102 contains a grip, allowing the user to securely hold the toothbrush 100 during cleaning the teeth of the pet animals. An actuation button (i.e., the power switch of the power switch assembly 102a) is positioned on the body portion 102. In use, the power switch controls the ON-OFF mechanism of the toothbrush 100. When turned on, the toothbrush head rotates in a vibratory manner, breaking up any food that may be present between the teeth of the pet animal, and not requiring the user to exercise back and forth manner brushing as common with non-powered toothbrushes. Another actuation button (such as the light source switch 102b) controls the lighting source of the toothbrush 100, completing the internal circuit such that the lighting source turns on to provide halo-illumination in the pet's mouth. As will be discussed later, the light source, when actuated, provides a halo-like illumination effect emanating from the toothbrush 100 to the mouth of the pet animal.

In an embodiment, the toothbrush 100 includes an axis along which a rear half of the body portion 102 is removably fixed to the front half of the body portion 102. In one example, the rear half of the body portion 102 may be removed from the front half of the body portion 102 to replace the battery or the one or more motors of the toothbrush 100. In another example, the rear half of the body portion 102 may be removed from the front half of the body portion 102 to perform maintenance work with respect to at least the battery or the one or more motors of the toothbrush 100.

Figure 2:
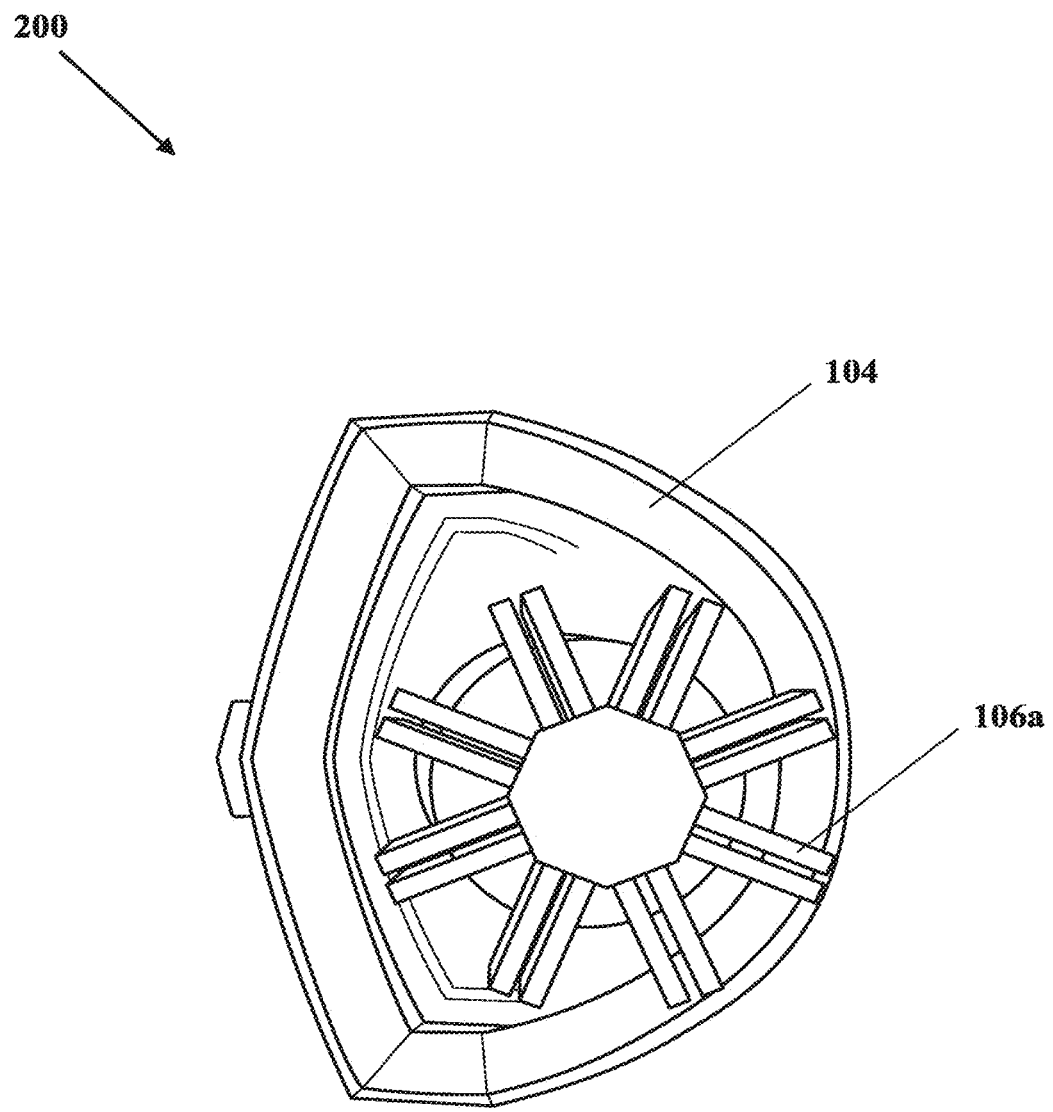
FIGS. 2 and 3 illustrate a bottom view and a top view of the toothbrush, in accordance with an embodiment of the present invention.
Figure 3:
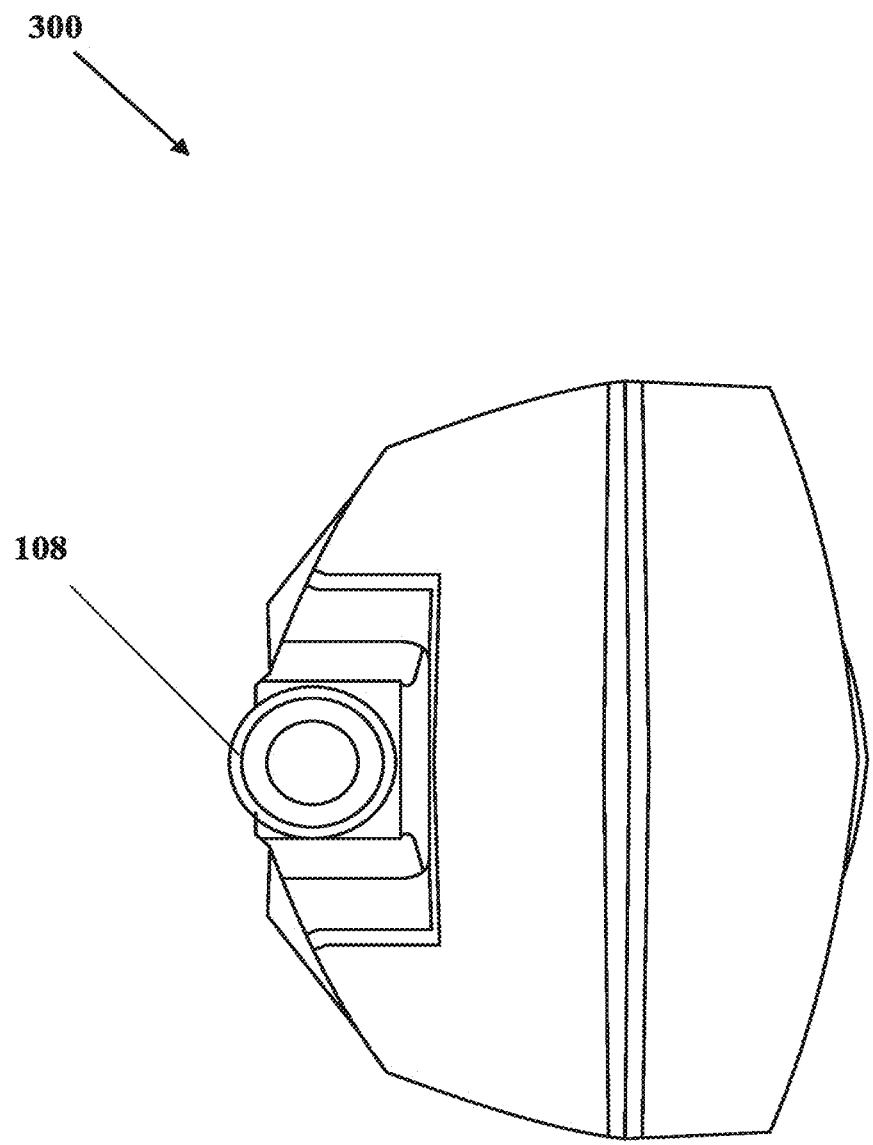

FIGS. 2 and 3 illustrate a bottom view 200 and a top view 300 of the toothbrush 100, in accordance with an embodiment of the present invention. In the top view 300 of the toothbrush 100 as shown in FIG. 3, the power chord 108 has been shown as removably fixed or attached to the input power supply terminal of the toothbrush 100. The other end of the power chord 108 may be connected to the mains power supply to provide electrical power to the battery of the toothbrush 100 for charging the battery or to the one or more motors of the toothbrush 100 for producing the rotational power, which in turn controls and manages the rotation of the brush head including bristles 106a.

In the bottom view 200 of the toothbrush 100 as shown in FIG. 2, the brush head has been shown that houses the bristles 106a of the toothbrush 100. The bristles 106a may be made of a plastic material. The bristles 106a may have different grades of grit ranging from course to soft to buff. The brush head including bristles 106a may include a concave-shaped bristles, a convex-shaped bristle, or a combination thereof, and may be removably fixed or attached to the inner connector. When the one or more motors are tuned ON, the middle portion 106 or a middle portion shaft housed inside the middle portion 106 (that is physically connected to a shaft of the one or more motors by means of one or more internal channels) starts rotating. The middle portion 106 or the middle portion shaft housed inside the middle portion 106 is rotatably attached to the brush head including bristles 106a, and thus, as the middle portion 106 or the middle portion shaft rotates, the brush head including bristles 106a may rotate or vibrate, and hence, the toothbrush 100 may be used for cleaning the teeth of the pet animal such as a pet dog or a pet cat. The direction of rotation of the brush head including bristles 106a or only the bristles 106a may be proportional to the direction of rotation of the shaft of the one or more motors. For example, if a shaft of a motor is rotating in clockwise direction, then the brush head including bristles 106a or only the bristles 106a may rotate in the clockwise direction. Similarly, if a shaft of a motor is rotating in anti-clockwise direction, then the brush head including bristles 106a or only the bristles 106a may rotate in the anti-clockwise direction. Alternatively, the toothbrush 100 may include a rotation controlling switch (not shown) that may be operated by the user to control the direction of rotation of the brush head including bristles 106a or only the bristles 106a. Alternatively, the toothbrush 100 may uniformly rotate in all direction due to the rotation of the shaft of the motor.

In operation, the power switch of the power switch assembly 102a may be operated by the user to activate or deactivate (i.e., turn ON or turn OFF) the toothbrush 100. For example, the toothbrush 100 is in an OFF state when the power switch is in the first position. In the first position, there is no power supply to the one or more motors of the toothbrush 100. Thus, the one or more motors are in the OFF state. As a result, the toothbrush 100 does not operate and the brush head including bristles 106a does not rotate or vibrate. In the second position, the power is being drawn either from the battery or the mains power supply and the drawn power is supplied to the one or more motors of the toothbrush 100. Thus, the one or more motors are in an ON state. As a result, the toothbrush 100 is turned ON and the brush head including bristles 106a rotates or vibrates at the medium speed. In the third position, the power is being drawn either from the battery or the mains power supply and the drawn power is supplied to the one or more motors of the toothbrush 100. Thus, the one or more motors are in the ON state. As a result, the toothbrush 100 is turned ON or remains in the ON state, and the brush head including bristles 106a rotates or vibrates at the high speed. During the operation of the toothbrush 100, the brush head including bristles 106a may start rotating either in the clockwise direction or in the anti-clockwise direction. When the brush head including bristles 106a or only the bristles 106a is rotating or vibrating, the user may use the toothbrush 100 for cleaning the teeth of the pet animal.

In an embodiment, the toothbrush 100 further includes the light source switch 102b that may be operated by the user to turn ON or turn OFF one or more LED's included in the light source portion 104. There are four modes of operating the light source switch 102b. In a first mode, when the light source switch 102b is pressed by the user, the front half of the light source portion 104 emits halogen light such as by means of one or more halogen light emitting LED's. In a second mode, when the light source switch 102b is pressed by the user, the rear half of the light source portion 104 emits halogen light such as by means of one or more halogen light emitting LED's. In a third mode, when the light source switch 102b is pressed by the user, the entire light source portion 104 emits light from all sides or directions such as by means of one or more halogen light emitting LED's. In a fourth mode, when the light source switch 102b is pressed by the user, all of the LED's (such as all of the halogen light emitting LED's) are turned OFF and do not emit any light.

Figure 4:
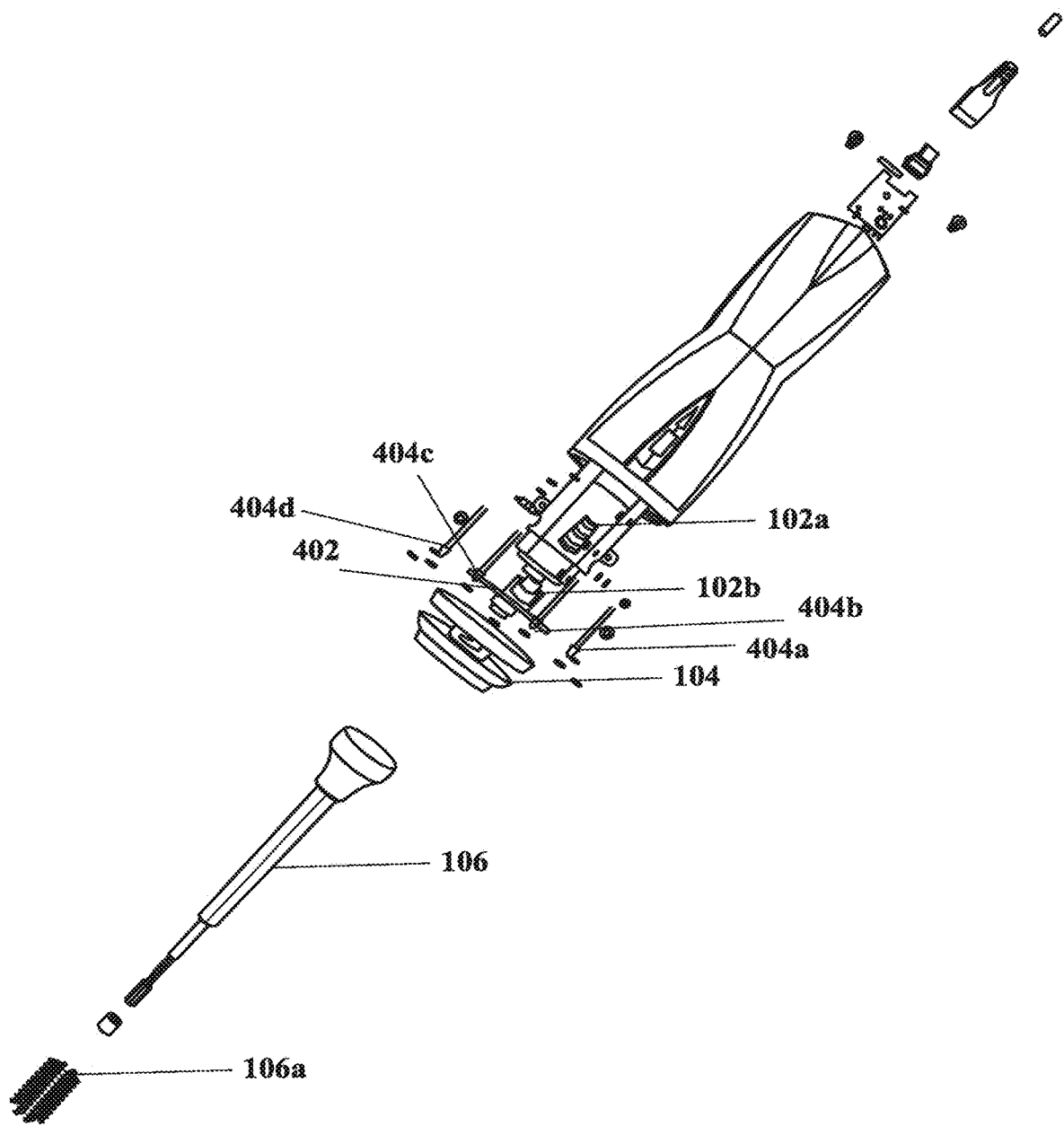
FIG. 4 illustrates a blown-up version of the toothbrush, in accordance with an embodiment of the present invention.

FIG. 4 illustrates a blown-up version of the toothbrush 100, in accordance with an embodiment of the present invention. The toothbrush 100 of FIG. 4 shows various components, for example, the power switch assembly 102a, the light source switch 102b, the light source portion 104, the middle portion 106, and the bristles 106a. The toothbrush 100 of FIG. 4 shows an LED panel 402 and LED's 404a-404d. In an embodiment, the LED panel 402 may be used for holding the LED's 404a-404d. For example, the LED's 404a-404d are removably inserted into appropriate LED holes provided on the LED panel 402. Further, input terminals of each of the LED's 404a-404d are connected to a power supply unit such as the battery of the toothbrush 100. The ON-OFF of each of the LED's 404a-404f may be associated with one or more modes of operation of the light source switch 102b. For example, in the first mode of the light source switch 102b, only few of the LED's 404a-404d such as the LED's 404b and 404c are turned ON and thus the front half of the LED panel 402 (including the LED's 404b and 404c) is lighted. In the second mode of the light source switch 102b, only few of the LED's 404a-404d such as the LED's 404a and 404d are turned ON and thus the rear half of the LED panel 402 (including the LED's 404a and 404d) is lighted. In the third mode of the light source switch 102b, all of the LED's 404a-404d are turned ON and thus the entire LED panel 402 (including the LED's 404a-404d) is lighted. In the fourth mode of the light source switch 102b, all of the LED's 404a-404d are turned OFF and thus the entire LED panel 402 (including the LED's 404a-404d) does not emit light.

In an embodiment, the LED panel 402 also includes an opening at its center that allows a shaft of a motor (positioned inside the toothbrush 100) to pass through it and makes a contact with a cylindrical metallic material (such as a cylindrical brass pin, a cylindrical stainless-steel pin, or any other appropriate material). For example, the shaft of the motor makes a physical contact with a first brass pin included inside the toothbrush 100. The first brass pin further makes another physical contact with a second brass pin included inside the toothbrush 100, for example, in the middle portion 106 or the middle portion shaft inside the middle portion 106. The brush head including the bristles 106a is removably attached (or removably makes physical contact) with the second brass pin. Thus, when the motor is turned ON, the shaft of the motor rotates, which in turn rotates the first brass pin and the second brass pin. Due to rotational motion of the second brass pin, the brush head including the bristles 106a attached (or making physical contact) with the second brass pin also rotates. Due to the rotation of the brush head including the bristles 106a and/or the physical contact of the brush head including the bristles 106a with the second brass pin during the rotation, the vibration in the brush head including the bristles 106a may be produced or generated. Thus, the brush head including the bristles 106a may vibrate from one side to another side. Such rotation and/or vibration of the brush head including the bristles 106a may be utilized for cleaning the teeth of the pet animals. In one example, the brush head including the bristles 106a only rotates along its axis and is used for cleaning the teeth of the pet animal. In another example, the brush head including the bristles 106a only vibrates from one side to another side and is used for cleaning the teeth of the pet animal. In yet another example, the brush head including the bristles 106a rotates as well as vibrates and is used for cleaning the teeth of the pet animal.

Figure 5:
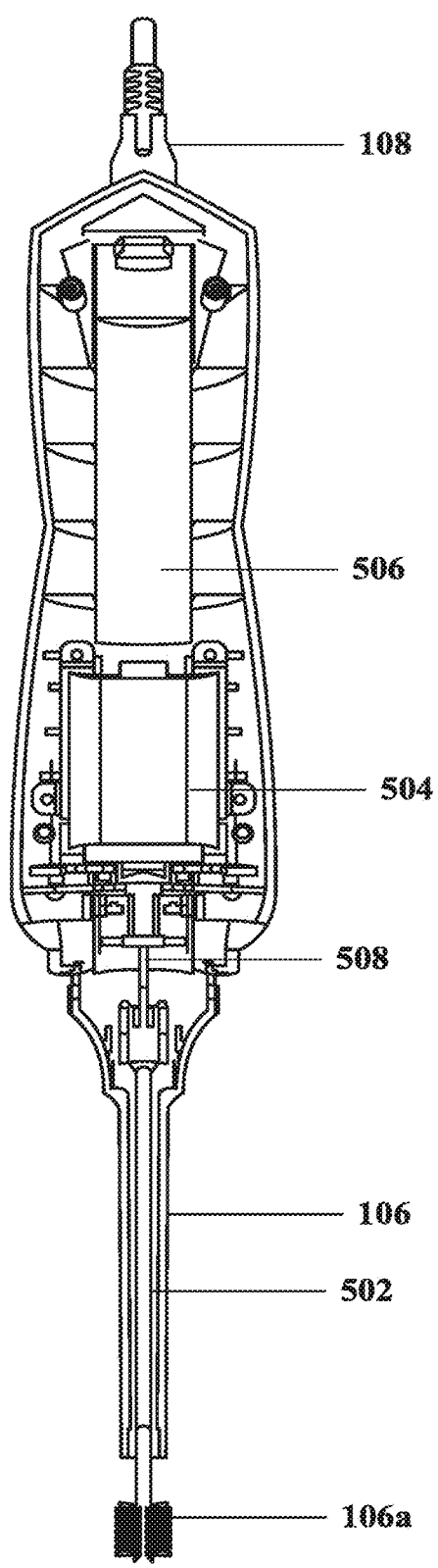
FIGS. 5 and 6 illustrate an inside view of the toothbrush as viewed from the front, in accordance with an embodiment of the present invention.
Figure 6:
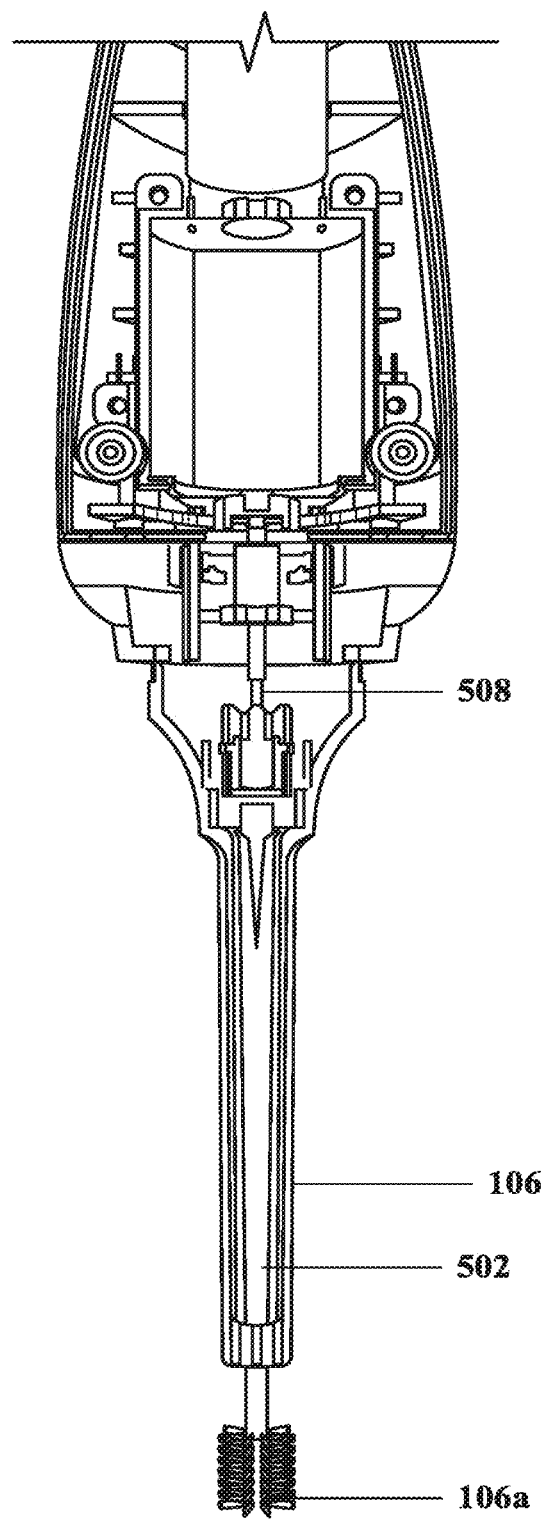

FIGS. 5 and 6 illustrate an inside view of the toothbrush as viewed from the front, in accordance with an embodiment of the present invention. In FIGS. 5 and 6, there is shown the middle portion 106, the bristles 106a, and the power chord 108. There is further shown the middle portion shaft 502, the motor 504, the battery 506, and the motor shaft 508. The middle portion shaft 502 is housed inside the middle portion 106. One end of the middle portion shaft 502 is connected to the motor shaft 508, and another end of the middle portion shaft 502 is connected to the brush head including the bristles 106a. As shown, the motor 504 and the battery 506 are housed inside the toothbrush 100. The motor 504 may be powered by the battery 506. The motor shaft 508 makes a contact with a cylindrical metallic material (such as a cylindrical brass pin, a cylindrical stainless-steel pin, or any other appropriate material). For example, the motor shaft 508 of the motor 504 makes a physical contact with the first brass pin included inside the toothbrush 100. The first brass pin further makes another physical contact with the second brass pin included inside the toothbrush 100, for example, in the middle portion 106 or the middle portion shaft 502 inside the middle portion 106. The brush head including the bristles 106a is removably attached (or removably makes physical contact) with the second brass pin. Thus, when the motor 504 is turned ON, the motor shaft 508 of the motor 504 rotates, which in turn rotates the first brass pin and the second brass pin. Due to rotational motion of the second brass pin, the middle portion shaft 502 also rotates, which in turn rotates the brush head including the bristles 106a.

Figure 7:
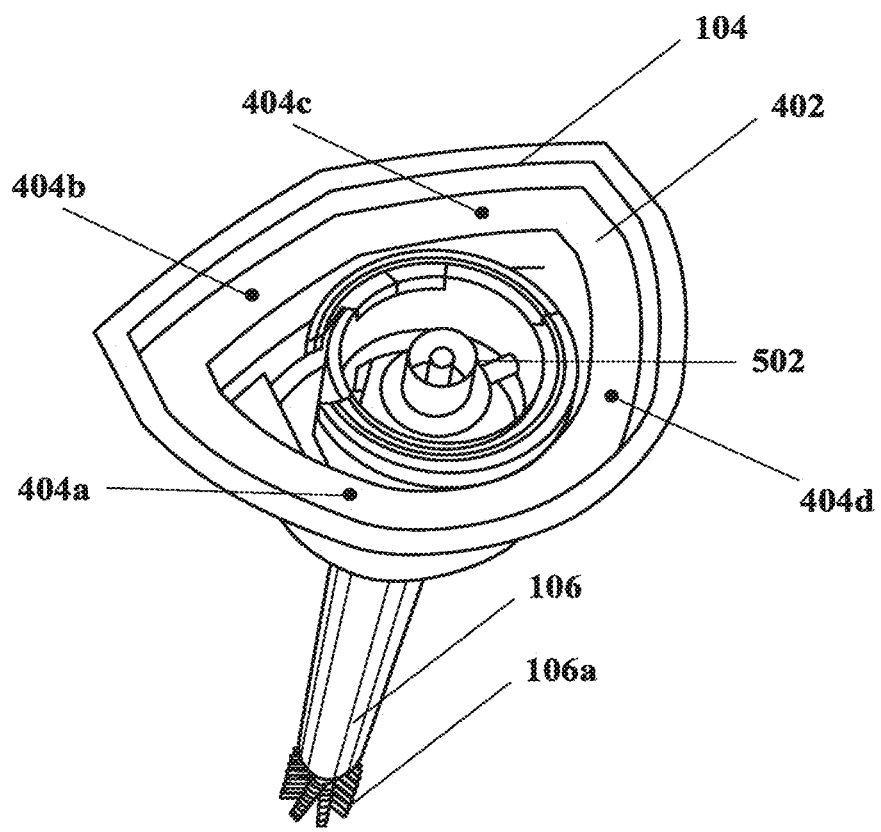
FIG. 7 illustrates a top isometric view showing bristles and LED panel of the toothbrush, in accordance with an embodiment of the present invention.

FIG. 7 illustrates a top isometric view showing the bristles 106a and the LED panel 402 of the toothbrush 100, in accordance with an embodiment of the present invention. The halo-illumination of the lighting source (such as the light source portion 104 including the LED panel 402) of the toothbrush 100 may be realized using the LED's 404a-404d. Each of the LED's 404a-404d is inserted into a respective slot of the LED panel 402. When turned on (i.e., the LED's 404a-404d are turned ON) via the light source switch 102b, the lighting source encircles the toothbrush 100 and highlights the four sides of the area of the pet's mouth which the user is cleaning at that time. The lighting source that provides the halo-illuminating effect may be the LED's 404a-404d, incandescent light bulb, and the like. The lighting source may be a white light or a blue light.

Figure 8:
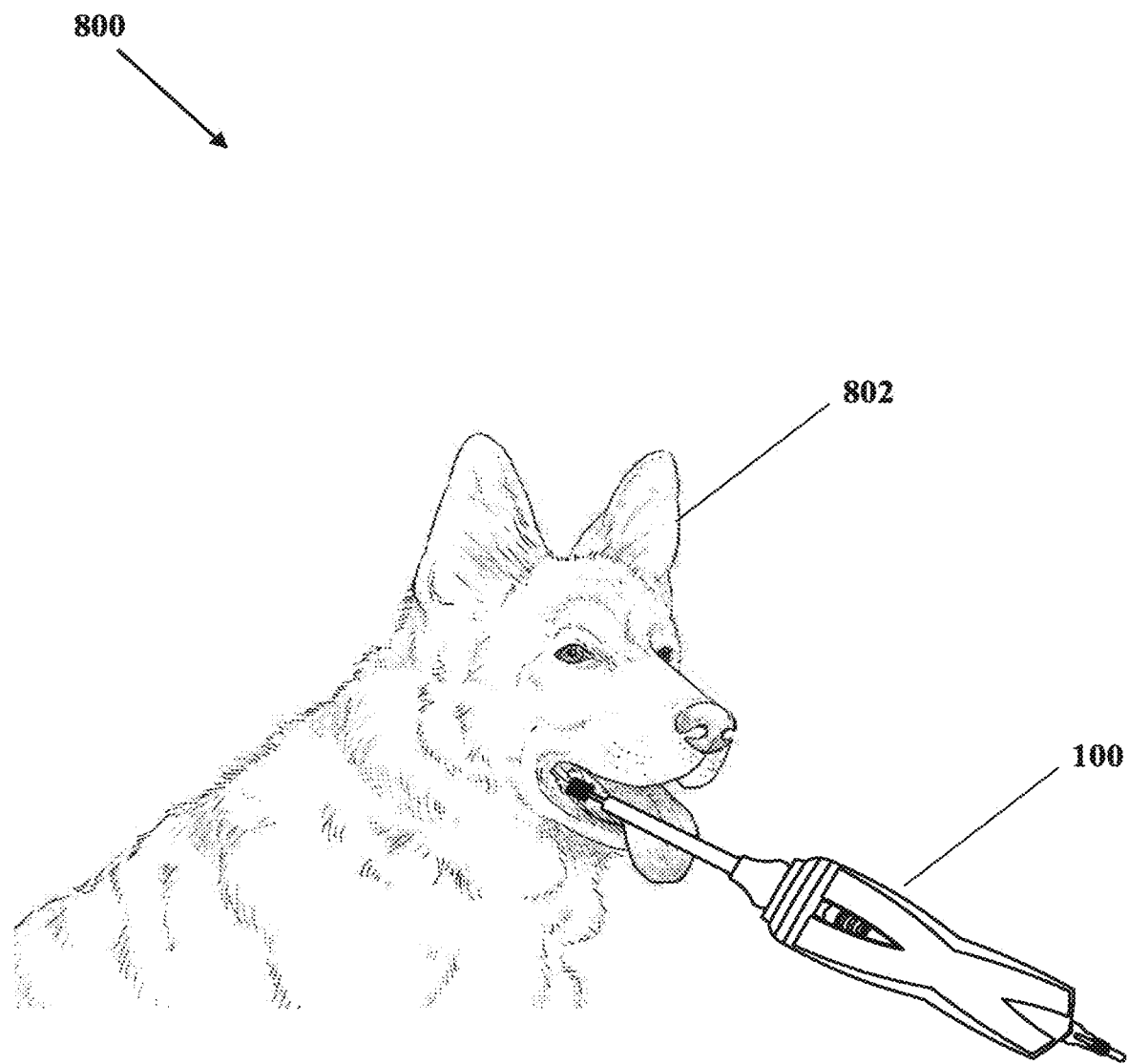
FIG. 8 shows an exemplary scenario for illustrating the usage of the toothbrush for cleaning a dog's teeth, in accordance with an embodiment of the present invention.

FIG. 8 shows an exemplary scenario 800 for illustrating the usage of the toothbrush 100 for cleaning a dog's teeth, in accordance with an embodiment of the present invention. FIG. 8 shows the toothbrush 100 as used in the mouth of a pet dog 802. Through the various features, including the elongated middle portion 106 and the halo-illumination from the lighting source, an owner gains access to all areas of the pet's mouth with sufficient visibility of all such areas. Specific to the invention, the lighting source is used to provide the halo-illumination lighting effect.

Although particular embodiments of the invention have been described in detail for purposes of illustration, various modifications and enhancements may be made without departing from the spirit and scope of the invention.

What is claimed is:

1. A toothbrush for cleaning teeth of a pet animal, comprising:
   a body portion, having at least one power switch and at least one light source switch,
   a light source portion for providing halo-illumination lighting, and
   an elongated middle portion having at least one removable bristle;
      wherein said at least one power switch having at least three switch positions for controlling rotational speed of said at least one removable bristle of said toothbrush, and
   said at least one light source switch having at least four modes for controlling illumination of said halo-illumination lighting that is used during cleaning of said pet animal teeth.

2. The toothbrush of claim 1, wherein said at least one power switch, having a first position for switching off said least one removable bristle such that said least one removable bristle is in a motionless state, a second position for switching on said least one removable bristle such that said least one removable bristle operates at a medium speed, and a third position for switching on said least one removable bristle such that said least one removable bristle operates at a high speed.

3. The toothbrush of claim 1, wherein said at least one light source switch having said at least four modes for controlling illumination of said light source portion of said toothbrush, wherein a first mode illuminates one or more LED's located within a front half of said light source portion, a second mode illuminates one or more LED's located within a rear half of said light source portion, a third mode illuminates one or more LED's in both front and rear halves of said light source portion, and a fourth mode deactivates all LED's in said light source portion.

4. The toothbrush of claim 3, wherein said front half of said light source portion comprises at least one halogen light emitting LED that is turned on when said at least one light source switch is in said first mode.

5. The toothbrush of claim 3, wherein said rear half of said light source portion comprises at least one halogen light emitting LED that is turned on when said at least one light source switch is in said second mode.

6. The toothbrush of claim 3, wherein an entire light source portion comprises one or more halogen light emitting LED's that are turned on when said at least one light source switch is in said third mode.

7. The toothbrush of claim 3, wherein an entire light source portion comprises one or more halogen light emitting LED's that are turned off when said at least one light source switch is in said fourth mode.

8. The toothbrush of claim 1, wherein said at least one power switch and said at least one light source switch are included on a front surface of an upper body portion of said body portion of said toothbrush.

9. The toothbrush of claim 1, wherein at least one bristle is removably fixed or attached to an inner shaft of said elongated middle portion, such that said at least one bristle may be removed and replaced with another bristle.

10. The toothbrush of claim 1, wherein said light source portion is positioned between an upper body portion of said toothbrush and said elongated middle portion of said toothbrush, and wherein said elongated middle portion includes a shaft that is removably connected to least one removable bristle.

11. The toothbrush of claim 1, wherein said at least one removable bristle is driven by means of at least one motor positioned inside said toothbrush body portion, and wherein said at least one motor is powered by a battery also positioned within said toothbrush body portion.

12. The toothbrush of claim 1, wherein said at least one removable bristle is driven by means of at least one motor positioned inside said toothbrush body portion, and wherein said at least one motor is powered by an external power supply connected to said at least one motor by means of a power chord.

* * * * *